United States Patent
Yang

(10) Patent No.: US 9,562,185 B2
(45) Date of Patent: Feb. 7, 2017

(54) HIGH-TEMPERATURE RESISTANT NANO COMPOSITE MINING ADDITIVE FOR MINING HEAVY OIL AND SUPER HEAVY OIL AND PREPARATION PROCESS THEREOF

(71) Applicant: GUNGHO CHARGE (TIANJIN) REFINED PETROLEUM TECHNOLOGY DEVELOPMENT CO., LTD., Tianjin (CN)

(72) Inventor: Yinhai Yang, Tianjin (CN)

(73) Assignee: GUNGHO CHARGE (TIANJIN) REFINED PETROLEUM TECHNOLOGY DEVELOPMENT CO., LTD (CN)

( * ) Notice: Subject to any disclaimer, the term of this patent is extended or adjusted under 35 U.S.C. 154(b) by 0 days.

(21) Appl. No.: 14/763,351

(22) PCT Filed: Nov. 29, 2013

(86) PCT No.: PCT/CN2013/088205
§ 371 (c)(1),
(2) Date: Jul. 24, 2015

(87) PCT Pub. No.: WO2014/206004
PCT Pub. Date: Dec. 31, 2014

(65) Prior Publication Data
US 2015/0361327 A1    Dec. 17, 2015

(30) Foreign Application Priority Data
Jun. 26, 2013 (CN) .......................... 2013 1 0261797

(51) Int. Cl.
| | |
|---|---|
| *C09K 8/584* | (2006.01) |
| *C09K 8/24* | (2006.01) |
| *C09K 8/36* | (2006.01) |
| *C09K 8/32* | (2006.01) |
| *C09K 8/60* | (2006.01) |
| *C09K 8/588* | (2006.01) |

(52) U.S. Cl.
CPC ............... *C09K 8/588* (2013.01); *C09K 8/584* (2013.01); *C09K 2208/10* (2013.01)

(58) Field of Classification Search
CPC ........... C09K 8/58; C09K 8/584; C09K 8/588; C09K 2208/10; C09K 2208/28; C09K 2208/34
USPC ................ 507/207, 133, 135, 136, 255, 261
See application file for complete search history.

(56) References Cited

U.S. PATENT DOCUMENTS

2014/0116695 A1* 5/2014 Maghrabi ................ C09K 8/74
166/279

FOREIGN PATENT DOCUMENTS

| CN | 101463249 A | 6/2009 |
|---|---|---|
| CN | 101531889 A | 9/2009 |
| CN | 101596428 A | 12/2009 |
| CN | 101735787 A | 6/2010 |
| CN | 102086389 A | 6/2011 |
| CN | 102838981 A | 12/2012 |
| CN | 103013466 A | 4/2013 |
| CN | 103320110 A | 9/2013 |

OTHER PUBLICATIONS

International Search Report for PCT/CN2013/088205 dated Mar. 27, 2014.
Chinese Office Action for 201310261797.6 dated Mar. 4, 2015.

* cited by examiner

*Primary Examiner* — Aiqun Li
(74) *Attorney, Agent, or Firm* — Hauptman Ham, LLP

(57) ABSTRACT

Disclosed is a high-temperature resistant nano composite mining additive for mining heavy oil and super heavy oil, which is prepared from 3-8 wt. % of a modified nano-inorganic additive, 3-8 wt. % of petroleum sulfonate, 10-40 wt. % of a viscosity depressant, 5-15 wt. % of an emulsifier, 2-10 wt. % of a surface wetting agent, 2-10 wt. % of a penetrant, 5-10 wt. % of a polymer modifier, and 1-8 wt. % of a catalyst, with a balance being water. Also disclosed is a preparation process for the above-mentioned high-temperature resistant nano composite mining additive for mining heavy oil and super heavy oil. The mining additive of the present invention has the advantages of a good high-temperature resistant performance, and an excellent emulsification performance and anti-salt performance, thereby significantly improving the efficiency of production and reducing the cost of mining.

6 Claims, No Drawings

HIGH-TEMPERATURE RESISTANT NANO COMPOSITE MINING ADDITIVE FOR MINING HEAVY OIL AND SUPER HEAVY OIL AND PREPARATION PROCESS THEREOF

TECHNICAL FIELD

The invention relates to the mining field of petroleum strengthening, and specifically to a high-temperature resistant nano composite mining additive for mining heavy oil and super heavy oil and preparation process thereof.

BACKGROUND

Since crude oil around the world is in short supply, the abundant heavy oil and super heavy oil increasingly attracted much attention. In the process of crude oil production, the crude oil in an oil layer penetrates into the well bottom through a porous media and then is lifted up to the ground by a lifting system. In the process of the heavy oil and the super heavy oil penetrating from the oil layer into the well bottom, some colloid, asphaltene, paraffin and other heavy components contained in the heavy oil and the super heavy oil are easily adhered to and accumulated on the surface near the wellhole due to their high content, high viscosity and slow flow velocity, which reduces the well yield, and the lifting process in the wellbore has high resistance and lifting difficulty, which brings great difficulty. Reducing the viscosity of the heavy oil and the super heavy oil and improving the flowability of the heavy oil and the super heavy oil are critical to solving mining, gathering and transportation issues of the heavy oil and the super heavy oil.

The viscosity reduction process commonly used in production of the heavy oil and the super heavy oil has reducing viscosity by heating, reducing viscosity by light oil blending and chemically reducing viscosity. Reducing viscosity by emulsifying the heavy oil and the super heavy oil exhibits significant advantage due to its low cost and high viscosity reduction rate and is widely applied.

Numerous examples of applying a heavy oil emulsifying viscosity depressant at home and abroad are the following: U.S. Pat. No. 4,333,488 reports a process for emulsifying heavy oil with an ethylene oxide-propylene oxide copolymer, which has a viscosity reduction rate of 80% for loco heavy oil with a viscosity of 340 cp at 21° C., wherein the appropriate mineralized water has a total ion concentration of 12,000 mg/L (in which the concentration of calcium and magnesium ions is 730 mg/L). CN1414058A discloses a viscosity reduction paraffin inhibitor for an oilfield polymer flooding well, which reduces the viscosity through chain scission caused by polymer oxidation.

CN88105018A discloses a process for reducing viscosity by emulsifying heavy oil, which emulsifies the heavy oil with polyxyethylated alkylphenol.

The above-mentioned prior art has the following disadvantages: 1) the employed heavy oil viscosity depressant is viscosity depressant with single performance, which has wide application range and is generally applied only to low viscosity heavy oil; 2) the high temperature resistant performance is poor and requirements for heavy oil quality is high; 3) the viscosity depressant has large dosage when in use and high cost; and 4) the viscosity depressant has a mineral salt resistance less than 3,000 mg/L and cannot be used when the calcium and magnesium ions in the formation water has high concentration.

SUMMARY

One object of the invention is to overcome the disadvantages of the prior art and to provide a high-temperature resistant nano composite mining additive for mining heavy oil and super heavy oil which is applicable at both a normal temperature and a high temperature and has an excellent emulsification performance and anti-salt performance.

Another object of the invention is to provide a preparation process for the above-mentioned high-temperature resistant nano composite mining additive for mining heavy oil and super heavy oil.

The objects of the invention are realized by the following technical solutions:

A high-temperature resistant nano composite mining additive for mining heavy oil and super heavy oil is prepared from the following components by weight percentage:
3-8% of a modified nano-inorganic additive;
3-8% of a petroleum sulfonate;
10-40% of a viscosity depressant;
5-15% of an emulsifier;
2-10% of a surface wetting agent;
2-10% of a penetrant;
5-10% of a polymer modifier;
1-8% of a promoter;
1-8% of a catalyst; and
a balance being water.

Among the above, the modified nano-inorganic additive is modified nano silicon dioxide, which has a nanoscale particle size of 1-100 nm and is prepared by the following steps:
1) Drying: drying nano $SiO_2$ with a particle size of 1-100 nm at 120-160° C. for 2-3 h;
2) Modifying: adding the dried nano $SiO_2$ into an absolute ethyl alcohol solution containing 2-10 wt. % of a silane coupling agent, reacting under a condition of 70-90° C. for 2-3 h for modifying; and
3) Refining: drawing and filtering the modified nano $SiO_2$ and then drying at a temperature of 110-120° C. for 1-2 h, yielding the modified nano $SiO_2$ particles.

The petroleum sulfonate is a product produced by a patent method (inventive patent No: ZL01110282.9) of Gunghe Charge (Tianjin) Refined Petroleum Technology Development Co., Ltd and is prepared by the following steps:
a) sulfonation: taking 150-500SN base oil of a petroleum refinery as the raw material, and sulfonating by a $SO_3$ gas; b) extraction separation: taking alkyl alcohol as an extraction agent with a weight ratio of acid oil:alkyl alcohol=0.5-10; c) second sulfonation: taking the extracted oil and dehydrating for second sulfonation; and d) neutralizing concentration: after the first and second sulfonation, dissolving the lower liquid extracted with the extraction agent in alkyl alcohol with solid inorganic base, after dissolving completely, neutralizing, distilling and condensing, yielding the petroleum sulfonate product after the alkyl alcohol completely evaporates. Among the above, in step a), the gas concentration while sulfonating is 1-5% (V/V), the air dew point is −79° C., the sulfonating temperature is 20-90° C., and the sulfonating end point is controlled to 20-100 mg NaOH/g. In step b), while in extraction separation, in a liquid separation device, the acid oil that is sulfonated to the end point is completely oscillated and mixed with the alkyl alcohol and then stands for layering for 2-14 h. In step c) of second sulfonation, the supernatant liquid, i.e., extracted oil, in the liquid separation device is dehydrated to a water content of 0-10%, wherein the temperature is 20-80° C., the gas concentration is 1-5% (V/V), the air dew point is −79° C., and the sulfonation end point is 10-90 mg NaOH/g, and then step b) is repeated for extraction separation. In step d), while in neutralizing concentration, the weight concentration of the inorganic base is 1-10%, the dripping speed is controlled to prevent heat release from excessively concentrating, the neutralizing end point controls pH=5-13, and the temperature is 60-130° C.

The viscosity depressant is a non-ionic surfactant, an anionic surfactant or mixture thereof in any proportion.

The non-ionic surfactant in the viscosity depressant is one of fatty alcohol polyoxyethylene ether phosphate, fatty alcohol polyoxyethylene ether carboxylate, allyl polyether sulfonate, isooctyl phenol polyethoxylate, alkylphenol polyoxyethylene, fatty alcohol polyoxyethylene ether, nonylphenol polyoxyethylene ether, polyethylene glycol octylphenol ether, polyoxyethylene oleate, fatty acid polyoxyethylene ether, hexamethylenediamine and polyoxyethylene alkyl amine or mixture of any two or more thereof in any proportion.

The anionic surfactant of the viscosity depressant is one of a petroleum sulfonate surfactant, a lignosulfonate surfactant, a heavy alkyl benzene sulfonate surfactant and a branch-alkylbenzene sulfonate surfactant or mixture of any two or more thereof in any proportion.

The emulsifier comprises one of TX-10 (R—$C_6H_4O$—($CH_2CH_2O)_{10}H$, R=$C_8$~$C_{10}$), TX-12 (R—$C_6H_4O$—($CH_2CH_2O)_{12}H$, R=$C_8$~$C_{10}$), TX-18 (R—$C_6H_4O$—($CH_2CH_2O)_{18}H$, R=$C_8$~$C_{10}$), AEO-9 (R—$C_6H_4O$—($CH_2CH_2O)_9H$, R=$C_{12}$~$C_{18}$), AEO-7 (R—$C_6H_4O$—($CH_2CH_2O)_7H$, R=$C_{12}$~$C_{18}$) and AEO-3 (R—$C_6H_4O$—($CH_2CH_2O)_3H$, R=$C_{12}$~$C_{18}$) or mixture of any, 2 or more thereof in any proportion.

The surface wetting agent is one of NEKAL (dibutyl naphthalenesulfonic acid sodium salt), polyoxyethylene alkylated ether, Tween-80 (polyoxyethylene sorbitan monooleate), Tween-60 (polyoxyethylene sorbitan monostearate), Span-80 (sorbitanoleate) and Span-60 (sorbitan-monostearate) or mixture of any 2 or more thereof in any proportion.

The penetrant is one of ethylene glycol, ethylene glycol butyl ether and sodium diethylhexyl sulfosuccinate or mixture of any two or more thereof in any proportion.

The polymer modifier is one of sorbitol, xylose, gelatin, xanthan gum, soluble starch, sodium methylcellulose, methylcellulose M20 (methylcellulose which degree of polymerization is 20), hydroxyethyl cellulose, hydroxy propyl cellulose, polyethylene glycol 600, polyethylene glycol 6000, polyvinylpyrrolidone and polyvinyl alcohol or mixture of any 2 or more thereof in any proportion.

The promoter is one of polyamine sodium, acrylamide, sodium sulfate, sodium sulfite, isopropyl alcohol, n-butyl alcohol, normal propyl alcohol and ethyl alcohol or mixture of any two or more thereof in any proportion.

The catalyst is organic base, which is one of triethanolamine, monoethanolamine and ethanediamine or mixture of any two or more thereof in any proportion.

The water is clear water or return water. The return water is water for being infused into the oil well in the oil field.

The invention also provides a preparation process for the above-mentioned high-temperature resistant nano composite mining additive for mining heavy oil and super heavy oil, comprising the following steps:

1) taking the above-mentioned petroleum sulfonate, viscosity depressant, promoter and catalyst in proportion for polymerization reaction at a reaction temperature of 60-150° C., preferably 60-100° C. for 2-6 h, preferably 3-5 h, yielding the composite surfactant;

2) uniformly mixing the composite surfactant obtained in step 1) with the modified nano-inorganic additive in proportion, yielding the main agent; and 3) mixing the main agent obtained in step 2) with the emulsifier, surface wetting agent, penetrant, polymer modifier and water in proportion for 1-2 h, yielding the above-mentioned high-temperature resistant nano composite mining additive for mining heavy oil and super heavy oil. The application method of the above-mentioned high-temperature resistant nano composite mining additive for mining heavy oil and super heavy oil comprises: First diluting the high-temperature resistant nano composite mining additive for mining heavy oil and super heavy oil with water to a concentration of 0.1-2 wt. %. Then, weighing the aqueous solution of the high-temperature resistant nano composite mining additive for mining heavy oil and super heavy oil according to a mass ratio of oil and the aqueous solution of the high-temperature resistant nano composite mining additive for mining heavy oil and super heavy oil of 80-60:20-40. Finally adding the heavy oil or super heavy oil into the weighed aqueous solution of the high-temperature resistant nano composite mining additive for mining heavy oil and super heavy oil at 25-350° C. for viscosity reduction by emulsifying and mining assist.

The invention has the following beneficial effects:

1) The viscosity reduction effect for the heavy oil and super heavy oil is outstanding, and the dosage is small. When the addition amount is 0.4-2 wt. %, the viscosity requirements for the heavy oil and super heavy oil can be satisfied, the viscosity reduction rate reaches 99% or more, the mining assist effect is obvious, and the oil production can be increased by more than 20%.

2) The product has an excellent anti-salt performance, and an ability of resisting water with a total ion concentration of 100,000 mg/L (in which $Ca^{2+}$ and $Mg^{2+}$ are 5,000 mg/L).

3) Since the raw material selected in this invention has high boiling point, the high-temperature resistant performance is good and the highest temperature resistance reaches 350° C.

4) When the product is in use, in the separation phase of oil and water, a good oil-water separation effect can be achieved without addition of demulsifying agent.

5) The surfactant, nano-inorganic additive and the like in the viscosity depressant used in the component of the invention are fine chemicals in the industrialized production, and are easily available. The water in the component is common clear water, and can be return water, which has good environmental protection effect and low production cost.

6) The product has simple preparation process, can be produced in batch, thereby belonging to the environment-friendly product.

7) The product has good low temperature resistance stability and has good flowability at a low temperature of −30° C., which can be used under a low temperature condition.

8) The experiments prove that under the viscosity reduction condition, the crude oil is dispersed to form an O/W-type emulsion, and the friction between oil films when the crude oil flows becomes that between water films, which greatly reduces the viscosity and frictional resistance. With the wetting, permeating and cleaning functions of the surfactant, the colloid, asphalt, paraffin and the like adhered and accumulated in the penetration duct can be removed to reduce the heavy oil viscosity in the duct to restore flowability. Resistance reduction by wetting destroys the heavy oil film on the surface of an oil pipe or a pumping rod, so that the surface wettability can be transformed into hydrophilcity to form a continuous water film, thereby reducing flow resistance of the crude oil in the drawing and lifting process. The above performances can together improve the recovery ratio of the crude oil in the oil well.

DETAILED DESCRIPTION

The mining additive and preparation process thereof of the invention are described in detail in conjunction with the specific embodiments.

Example 1

6.0 g of petroleum sulfonate, 10.0 g of fatty alcohol polyoxyethylene ether, 8.0 g of isooctyl phenol polyethoxylate, 20.0 g of lignosulfonate, 3.0 g of sulfite, 3.0 g of monoethanolamine are polymerized in a mixer with a stirring device at 90° C. for 4 h. 4.0 g of modified nano silicon dioxide is then added and mixed for 1 h. Finally, 10.0 g of emulsifier TX-10 (R—$C_6H_4$O—$(CH_2CH_2O)_{10}$H, R=$C_8$~$C_{10}$), 6.0 g of NEKAL (dibutyl naphthalenesulfonic acid sodium salt), 8.0 g of sodium diethylhexyl sulfosuccinate and 6.0 g of polyvinyl alcohol are added, and clear water is added to 100 g for stirring at a room temperature for 1 h, yielding the high-temperature resistant nano composite mining additive for mining heavy oil and super heavy oil.

Example 2

6.0 g of petroleum sulfonate, 4.0 g of fatty alcohol polyoxyethylene ether phosphate, 5.0 g of polyethylene glycol octylphenol ether, 10.0 g of lignosulfonate, 4.0 g of polyamine salt and 4.0 g of monoethanolamine are polymerized in a mixer with a stirring device at 80° C. for 6 h. 4.0 g of modified nano silicon dioxide is then added and mixed for 1 h. 8.0 g of emulsifier AEO-9 (R—$C_6H_4$O—$(CH_2CH_2O)_9$H, R=$C_{12}$~$C_{18}$), 8.0 g of NEKAL (dibutyl naphthalenesulfonic acid sodium salt), 8.0 g of sodium diethylhexyl sulfosuccinate and 6.0 g of polyethylene glycol 6000 are added, and clear water is added to 100 g for stirring at a room temperature for 2 h, yielding the high-temperature resistant nano composite mining additive for mining heavy oil and super heavy oil.

Example 3

5.0 g of petroleum sulfonate, 7.0 g of fatty alcohol polyoxyethylene ether phosphate, 10.0 g of isooctyl phenol polyethoxylate, 21.0 g of lignosulfonate, 3.0 g of sulfate and 3.0 g of triethanolamine are polymerized in a mixer with a stirring device at 95° C. for 3 h. 6.0 g of modified nano silicon dioxide is added and mixed for 1.5 h. Finally 10.0 g of emulsifier TX-10 (R—$C_6H_4$O—$(CH_2CH_2O)_{10}$H, R=$C_8$~$C_{10}$), 6.0 g of Span-80 (sorbitanoleate), 10.0 g of sodium diethylhexyl sulfosuccinate and 3.0 g of sorbitol are added, and clear water is added to 100 g for stirring at a room temperature for 1 h, yielding the high-temperature resistant nano composite mining additive for mining heavy oil and super heavy oil.

Example 4

5.0 g of petroleum sulfonate, 15.0 g of fatty alcohol polyoxyethylene ether carboxylate, 6.0 g of branch-alkyl-benzene sulfonate, 18.0 g of lignosulfonate, 4.0 g of sulfite and 3.0 g of monoethanolamine are polymerized in a mixer with a stirring device at 70° C. for 5 h. 7.0 g of modified nano silicon dioxide is then added and mixed for 1 h. 8.0 g of emulsifier TX-10 (R—$C_6H_4$O—$(CH_2CH_2O)_{10}$H, R=$C_8$~$C_{10}$), 10.0 g of NEKAL (dibutyl naphthalenesulfonic acid sodium salt), 4.0 g of ethylene glycol butyl ether, 3.0 g of polyvinyl alcohol and clear water are added into a mixer with a stirring device to 100 g for stirring at a room temperature for 1.5 h, yielding the high-temperature resistant nano composite mining additive for mining heavy oil and super heavy oil.

The performance test method of the product of the invention is illustrated below.

1. Measurement of Emulsifying Viscosity Reduction Rate of Heavy Oil:

Main Experimental Equipment:

Rotary viscosimeter: DV-III (Brookfield Company);

Thermostatic water bath: control accuracy of +/−2° C.;

Stirrer: highest rotational speed of 500 r/min.

(1) Measurement of Heavy Oil Viscosity

The heavy oil is placed in a thermostatic water bath at (50+/−1)° C. for 1 h and is stirred to remove free water and bubbles therein. A rotary viscosimeter is used for quickly measuring the viscosity $\eta_0$ at (50+/−1)° C.

(2) Dilution of High-Temperature Resistant Nano Composite Mining Additive for Mining Heavy Oil and Super Heavy Oil.

A saline solution containing 3% of NaCl and 0.3% of $CaCl_2$ is prepared and is used to dilute a sample of the high-temperature resistant nano composite mining additive for mining heavy oil and super heavy oil to a solution with a mass fraction of 1%;

(3) Measurement of Emulsifying Viscosity Reduction Rate of High-Temperature Resistant Nano Composite Mining Additive for Mining Heavy Oil and Super Heavy Oil 280 g of heavy oil (oil sample of the oil field in Liao River) and 120-180 g (accurate to 0.1 g) of diluent for the high-temperature resistant nano composite mining additive for mining heavy oil and super heavy oil are put into a flask. The flask is then put into a thermostatic water bath at (50+/−1)° C. for 1 h. A stirring paddle is placed at the center of the flask and at a distance of 2-3 mm from the bottom. The rotational speed is adjusted to 250 r/min, the solution is stirred at a constant temperature for 2 min and then the viscosity $\eta_1$ is measured.

The viscosity reduction rate is calculated in the following formula.

$$\text{Viscosity reduction rate} = \frac{\eta_0 - \eta_1}{\eta_0} \times 100\%$$

In the above formula, $\eta_0$ (mPa·s) is the viscosity of the heavy oil sample at 50° C. $\eta_1$ (mPa·s) is the viscosity of the heavy oil emulsion after being added with the high-temperature resistant nano composite mining additive for mining heavy oil and super heavy oil.

Example Effects:

TABLE 1

Viscosity reduction rate of the high-temperature resistant nano composite mining additive for mining heavy oil and super heavy oil

| NO. | Viscosity of heavy oil sample (mPa·s) (50° C.) | Addition amount (wt. %) of the high-temperature resistant nano composite mining additive for mining heavy oil and super heavy oil | Viscosity of heavy oil emulsifying liquid (mPa·s) (50° C.) | Viscosity reduction rate (%) |
|---|---|---|---|---|
| Example 1 | 188,700 | 0.3 | 98.2 | 99.86 |
| Example 2 | | 0.3 | 131.5 | 99.87 |
| Example 3 | | 0.4 | 125.3 | 99.90 |
| Example 4 | | 0.4 | 181.2 | 99.90 |

The test results of Table 1 show that: with the addition amount of the high-temperature resistant nano composite mining additive for mining heavy oil and super heavy oil being 0.3-0.4% of the total amount of the oil-water, the high-temperature resistant nano composite mining additives for mining heavy oil and super heavy oil prepared in Examples 1-4 can form an emulsifying system within a viscosity range of 50-200 mPa·s for the heavy oil, and the viscosity reduction rate reaches 99% or more;

Similarly, the high-temperature resistant nano composite mining additive for mining heavy oil and super heavy oil prepared in Example 1 is selected. The effects of performing viscosity reduction to the heavy oils with different viscosities (oil sample of the oil field in Liao River) according to the above-mentioned steps are as follows.

TABLE 2

Viscosity reduction rate of the high-temperature resistant nano composite mining additive for mining heavy oil and super heavy oil

| NO. | Viscosity of heavy oil sample (mPa·s) (50° C.) | Addition amount of high-temperature resistant nano composite mining additive for mining heavy oil and super heavy oil (wt. %) | Viscosity of heavy oil emulsifying liquid (mPa·s) (50° C.) | Viscosity reduction rate (%) |
|---|---|---|---|---|
| Example 1 | 69200 | 0.3 | 48.2 | 99.93 |
| | 123000 | 0.3 | 85.8 | 99.93 |
| | 388500 | 0.4 | 151.2 | 99.96 |
| | 625100 | 0.4 | 176.1 | 99.97 |

The test results of Table 2 show that: with the addition amount of the high-temperature resistant nano composite mining additive for mining heavy oil and super heavy oil being 0.3-0.4% of the total amount of the oil-water, the additive can form an emulsifying system within a viscosity range of 50-200 mPa·s for the heavy oils with different viscosities, and the viscosity reduction rate reaches 99% or more.

2. Measurement of High-Temperature Resistance of High-Temperature Resistant Nano Composite Mining Additive for Mining Heavy Oil and Super Heavy Oil The high-temperature resistant nano composite mining additives for mining heavy oil and super heavy oil prepared in Examples 1-4 are respectively packaged by a sealed stainless steel aging tank and placed in a muffle at 350° C. for 48 h after replacing air with dry ice. After cooling, the additives are slowly unsealed in a container containing water, and then viscosity reduction effect is measured according to the above-mentioned measurement method for emulsifying viscosity reduction rate of the heavy oil.

Example Effects:

TABLE 3

Performance measurement of the high-temperature resistant nano composite mining additive for mining heavy oil and super heavy oil

| NO. | Viscosity of heavy oil sample (mPa·s) (50° C.) | Addition amount (%) of the high-temperature resistant nano composite mining additive for mining heavy oil and super heavy oil after high temperature treatment | Viscosity of heavy oil emulsifying liquid (mPa·s) (50° C.) | Viscosity reduction rate (%) |
|---|---|---|---|---|
| Example 1 | 188,700 | 0.3 | 1,093.36 | 98.42 |
| Example 2 | | 0.3 | 1,329.75 | 98.65 |
| Example 3 | | 0.4 | 1,574.4 | 98.72 |
| Example 4 | | 0.4 | 2,094.57 | 98.89 |

As shown in Table 3, the viscosity reduction rate is slight reduced but still higher than 98% after the high-temperature resistant nano composite mining additive for mining heavy oil and super heavy oil is processed at a high temperature of 350° C. for 48 h.

3. Measurement of Natural Settling Dehydration Rate

The heavy oil is placed in a thermostatic water bath at $(50+/-1)°$ C. for 1 h and is stirred to remove free water and bubbles therein. Meanwhile, a saline solution containing 3% of NaCl and 0.3% of $CaCl_2$ is prepared and is used to dilute a sample of the high-temperature resistant nano composite mining additive for mining heavy oil and super heavy oil to a solution with a mass fraction of 1%. 210 g of the heavy oil sample prepared by the above-mentioned method is weighed and put into a flask. 90 g of a solution of the high-temperature resistant nano composite mining additive for mining heavy oil and super heavy oil is added into the flask. The flask is then put into a thermostatic water bath at $(50+/-1)°$ C. for 1 h. A stirring paddle is placed at the center of the flask and at a distance of 2-3 mm from the bottom. The rotational speed is adjusted to 250 r/min and the solution is stirred at a constant temperature for 2 min to prepare 300 ml of heavy oil emulsion. The emulsion is then quickly added into a 100 ml measuring cylinder with stopper or a scale test tube with stopper and placed in a thermostatic water bath at $(50+/-1)°$ C. for 60 min. The effluent volume V on the lower part of the measuring cylinder is read. The natural settling dehydration rate is calculated in the following formula.

$$S = \frac{V}{30} \times 100\%$$

In the formula, S is the natural settling dehydration rate;

V (ml) is the dehydration volume after making the heavy oil emulsion stand;

30-100 mL is the water content (ml) of the heavy oil emulsion.

Example Effects:

TABLE 4

Natural settling dehydration rate of the heavy oil sample with addition of the high-temperature resistant nano composite mining additive for mining heavy oil and super heavy oil

| NO. | Viscosity of heavy oil sample (mPa·s) (50° C.) | Dosage (%) of high-temperature resistant nano composite mining additive for mining heavy oil and super heavy oil | Natural settling dehydration rate (%) (50° C.) |
|---|---|---|---|
| Example 1 | 188,700 | 0.3 | 93.5 |
| Example 2 |  | 0.3 | 91.6 |
| Example 3 |  | 0.4 | 91.2 |
| Example 4 |  | 0.4 | 90.3 |

As shown in Table 4, the dehydration rate of the emulsion of the high-temperature resistant nano composite mining additive for mining heavy oil and super heavy oil can reach 90% or more, which means that the emulsion has a good natural settling dehydration performance.

4. Measurement of Salt Resistance of High-Temperature Resistant Nano Composite Mining Additive for Mining Heavy Oil and Super Heavy Oil Similarly, hard water solutions with different degrees of mineralization are prepared according to the proportions of 1% of NaCl, 0.1% of $MgSO_4$ and 0.1% of $CaCl_2$. The high-temperature resistant nano composite mining additive for mining heavy oil and super heavy oil prepared in Example 1 is selected and dissolved in the above-mentioned hard water solution containing a certain amount of calcium and magnesium ions (in addition to the calcium and magnesium ions, sodium ions are included) in a mass percentage of 0.3%. At a temperature of 50° C., the viscosities of the emulsified heavy oils with different degrees of mineralization are measured. The effects of performing viscosity reduction by using the heavy oils with different viscosities according to the above-mentioned steps are as follows:

TABLE 5 viscosity reduction rate (%) of the high-temperature resistant nano composite mining additive for mining heavy oil and super heavy oil for heavy oils with different viscosities at different degrees of mineralization

| Degree of mineralization (mg/L) | Viscosity of heavy oil 69,200 mPa·s (50° C.) | Viscosity of heavy oil 188,700 mPa·s (50° C.) | Viscosity of heavy oil 388,500 mPa·s (50° C.) |
|---|---|---|---|
| 5,000 | 99.96 | 99.98 | 99.97 |
| 10,000 | 99.20 | 99.05 | 99.93 |
| 30,000 | 98.72 | 97.25 | 96.16 |
| 100,000 | 97.13 | 95.45 | 91.56 |

As shown in Table 5, with the increase of the contents of calcium and magnesium ions in the simulation formation water, the degree of mineralization of water increases and the viscosity of the emulsion increases, but the mining additive still has a strong emulsifying ability for different heavy oils in hard water.

The high-temperature resistant nano composite mining additive for mining heavy oil and super heavy oil of the invention reduces the viscosity by using a nano composite emulsifying viscosity reduction mechanism. On one hand, with the features of small size, large specific surface area and good absorbability of the modified nano additive, the oil-water interface tension is greatly reduced, so that in the process of the injected fluid flushing the hole, the crude oil is easily stripped into small oil drops and displaced with a displacing fluid. On the other hand, the high-temperature resistant nano composite mining additive for mining heavy oil and super heavy oil is mixed with the heavy oil seeped into the well bottom from the formation to form an O/W-type emulsion whose viscosity reduction rate can reach 99% or more as compared with the heavy oil and super heavy oil. The viscosity of the heavy oil and super heavy oil in the formation and the resistance due to high viscosity in the lifting process can be greatly reduced, thereby improving the exploitation quantity of the heavy oil and super heavy oil.

The invention claimed is:

1. A high-temperature resistant nano composite mining additive for mining heavy oil and super heavy oil, characterized in that, it is prepared from the following components by weight percentage:
   3-8% of a modified nano-$SiO_2$ with a particle size of 1-100 nm;
   3-8% of a petroleum sulfonate;
   10-40% of a viscosity depressant,
   wherein the viscosity depressant is one of fatty alcohol polyoxyethylene ether phosphate, fatty alcohol polyoxyethylene ether carboxylate, and allyl polyether sulfonate, or mixture of any two or more thereof in any proportion; or one of a lignosulfonate surfactant, a heavy alkyl benzene sulfonate surfactant and a branch-alkylbenzene sulfonate surfactant or mixture of any two or more thereof in any proportion;
   5-15% of an emulsifier,
   wherein the emulsifier is one of R—$C_6H_4$O—$(CH_2CH_2)_{10}$H, wherein R is $C_8$-$C_{10}$ alkyl; R—$C_6H_4$O—$(CH_2CH_2)_{12}$H, wherein R is $C_8$-$C_{10}$ alkyl; R—$C_6H_4$O—$(CH_2CH_2)_{18}$H, wherein R is $C_8$-$C_{10}$ alkyl; R—$C_6H_4$O—$(CH_2CH_2)_9$H, wherein R is $C_{12}$-$C_{18}$ alkyl; R—$C_6H_4$O—$(CH_2CH_2)_7$H, wherein R is $C_{12}$-$C_{18}$ alkyl; R—$C_6H_4$O—$(CH_2CH_2)_3$H, wherein R is $C_{12}$-$C_{18}$ alkyl; or mixture of any 2 or more thereof in any proportion;
   2-10% of a surface wetting agent, wherein the surface wetting agent is one of dibutyl naphthalenesulfonic acid sodium salt, polyoxyethylene alkylated ether, polyoxyethylene(20) sorbitan monooleate, polyoxyethylene(20) sorbitan monostearate, sorbitanololeate and sorbitanmonostearate or mixture of any 2 or more thereof in any proportion;
   2-10% of a penetrant;
   5-10% of a polymer modifier,
   wherein the polymer modifier is one of sorbitol, xylose, gelatin, xanthan gum, soluble starch, sodium methyl cellulose, methylcellulose which degree of polymerization is 20, hydroxyethyl cellulose, hydroxy propyl cellulose, polyethylene glycol 600, polyethylene glycol 6000, polyvinylpyrrolidone and polyvinyl alcohol or mixture of any two or more thereof in any proportion;
   1-8% of a promoter, wherein the promoter is one of polyamine sodium, acrylamide, sodium sulfate, sodium sulfite, isopropyl alcohol, n-butyl alcohol, normal propyl alcohol and ethyl alcohol or mixture of any two or more thereof in any proportion; and
   1-8% of a catalyst, wherein the catalyst is organic base; and a balance being water.

2. The high-temperature resistant nano composite mining additive for mining heavy oil and super heavy oil of claim 1, characterized in that: the modified nano-$SiO_2$ with a particle size of 1-100 is prepared by the following steps:
  1) drying: drying nano-$SiO_2$ with a particle size of 1-100 nm at 120-160° C. for 2-3 h;
  2) modifying: adding the dried nano-$SiO_2$ into an absolute ethyl alcohol solution containing 2-10 wt % of a silane coupling agent 3-Methacryloxypropyltrimethoxysilane, reacting under a condition of 70-90° C. for 2-3 h for modifying; and
  3) refining: drawing and filtering the modified nano-$SiO_2$ and then drying at a temperature of 110-120° C. for 1-2 h, yielding the modified nano-$SiO_2$ particles.

3. The high-temperature resistant nano composite mining additive for mining heavy oil and super heavy oil of claim 1, characterized in that: the penetrant is one of ethylene glycol, ethylene glycol butyl ether and sodium diethylhexyl sulfosuccinate or mixture of any two or more thereof in any proportion.

4. The high-temperature resistant nano composite mining additive for mining heavy oil and super heavy oil of claim 1, characterized in that: the organic base is one of triethanolamine, monoethanolamine and ethanediamine or mixture of any two or more thereof in any proportion.

5. A preparation process for the high-temperature resistant nano composite mining additive for mining heavy oil and super heavy oil of claim 1, characterized in that, it comprises the following steps:
  1) taking the above-mentioned petroleum sulfonate, viscosity depressant, promoter and catalyst in proportion for polymerization reaction at 60-150° C. for 2-6 h, yielding a composite surfactant; wherein the catalyst is organic base;
  wherein the viscosity depressant is one of fatty alcohol polyoxyethylene ether phosphate, fatty alcohol polyoxyethylene ether carboxylate, and allyl polyether sulfonate or mixture of any two or more thereof in any proportion; or one of a lignosulfonate surfactant, a heavy alkyl benzene sulfonate surfactant and a branch-alkylbenzene sulfonate surfactant or mixture of any two or more thereof in any proportion; and
  wherein the promoter is one of polyamine sodium, acrylamide, sodium sulfate, sodium sulfite, isopropyl alcohol, n-butyl alcohol, normal propyl alcohol and ethyl alcohol or mixture of any two or more thereof in any proportion;
  2) uniformly mixing the composite surfactant obtained in step 1) with the modified nano-$SiO_2$ with a particle size of 1-100 nm additive in proportion, yielding a main agent; and
  3) mixing the main agent obtained in step 2) with the emulsifier, surface wetting agent, penetrant, polymer modifier and water in proportion for 1-2 h, yielding the above-mentioned high-temperature resistant nano composite mining additive for mining heavy oil and super heavy oil, wherein the emulsifier is one of R—$C_6H_4$O—$(CH_2CH_2)_{10}$H, wherein R is $C_8$-$C_{10}$ alkyl; R—$C_6H_4$O—$(CH_2CH_2)_{12}$H, wherein R is $C_8$-$C_{10}$ alkyl; R—$C_6H_4$O—$(CH_2CH_2)_{18}$H, wherein R is $C_8$-$C_{10}$ alkyl; R—$C_6H_4$O—$(CH_2CH_2)_9$H, wherein R is $C_{12}$-$C_{18}$ alkyl; R—$C_6H_4$O—$(CH_2CH_2)_7$H, wherein R is $C_{12}$-$C_{18}$ alkyl; R—$C_6H_4$O—$(CH_2CH_2)_3$H, wherein R is $C_{12}$-$C_{18}$ alkyl; or mixture of any two or more thereof in any proportion;
  wherein the surface wetting agent is one of dibutyl naphthalenesulfonic acid sodium salt, polyoxyethylene alkylated ether, polyoxyethylene(20) sorbitan monooleate, polyoxyethylene(20) sorbitan monostearate, sorbitanololeate and sorbitanmonostearate or mixture of any two or more thereof in any proportion; and
  wherein the polymer modifier is one of sorbitol, xylose, gelatin, xanthan gum, soluble starch, sodium methyl cellulose, methylcellulose which degree of polymerization is 20, hydroxyethyl cellulose, hydroxy propyl cellulose, polyethylene glycol 600, polyethylene glycol 6000, polyvinylpyrrolidone and polyvinyl alcohol or mixture of any two or more thereof in any proportion.

6. The preparation process of claim 5, characterized in that, the polymerization reaction of the composite surfactant obtained in step 1) has a temperature of 60-100° C. and a reaction time of 3-5 h.

* * * * *